United States Patent [19]

Okumoto et al.

[11] Patent Number: 5,135,227
[45] Date of Patent: Aug. 4, 1992

[54] WOOD-TYPE METAL GOLF CLUB HEAD AND PROCESS FOR PRODUCING THE SAME

[75] Inventors: Takaharu Okumoto, Chigasaki; Heihatiro Soeda, Hiratsuka, both of Japan

[73] Assignee: The Yokohama Rubber Co., Ltd., Tokyo, Japan

[21] Appl. No.: 750,306

[22] Filed: Aug. 27, 1991

[51] Int. Cl.⁵ ............................................. A63B 53/04
[52] U.S. Cl. ........................ 273/167 R; 273/167 H; 273/DIG. 7; 264/45.3; 264/DIG. 6
[58] Field of Search ........... 273/167 R, 167 F, 167 H, 273/169, 170–175, 167 J, DIG. 7, DIG. 23; 264/45.4, DIG. 6, 45.3

[56] References Cited

U.S. PATENT DOCUMENTS

| | | | |
|---|---|---|---|
| 3,864,181 | 2/1975 | Wolinski et al. | 264/45.3 |
| 4,128,963 | 12/1978 | Dano | 264/45.3 |
| 4,413,822 | 11/1983 | Fernandez et al. | 264/45.3 |
| 5,007,643 | 4/1991 | Okumoto et al. | 273/167 H |

FOREIGN PATENT DOCUMENTS

| | | | |
|---|---|---|---|
| 0122580 | 7/1985 | Japan | 273/169 |
| 3005767 | 1/1988 | Japan | 273/167 R |
| 2124182 | 5/1990 | Japan | 273/167 R |

Primary Examiner—Paul E. Shapiro
Assistant Examiner—Steven B. Wong
Attorney, Agent, or Firm—Finnegan, Henderson, Farabow, Garrett & Dunner

[57] ABSTRACT

A wood-type metal golf club head comprising a hollow metal head body and a core material filling the inside of the metal head body, wherein the core material is an aggregate prepared by fusing expandable beads comprising a microcapsule of a synthetic polymer and an expanding gas enclosed therein to each other by the expansion of the gas and has a bulk specific gravity of 0.05 to 0.15 g/cm³.

10 Claims, 1 Drawing Sheet

WOOD-TYPE METAL GOLF CLUB HEAD AND PROCESS FOR PRODUCING THE SAME

BACKGROUND OF THE INVENTION

The present invention relates to a wood-type metal golf club head which can give a lengthened shot and reduce the undesirable metallic sound during hitting.

In the production of a conventional wood-type metal golf club head, rigid polyurethane foam is injected thereinto as core material in order to improve its feel when it is hit. However, the rigid polyurethane foam is difficult to fill in the cavity of a metal head body with its cells uniformly dispersed therein, with the result that some cells are joined together to form a so-called void or a large crevice. This causes the disadvantage of an undesirable metallic sound during hitting and a reduction in the length of the shot.

SUMMARY OF THE INVENTION

An object of the present invention is to overcome the above disadvantages and provide a wood-type metal golf club, head which can give a lengthened shot and reduce the metallic sound during hitting.

Another object of the present invention is to provide a wood-type metal golf club head making a sound akin to that of a persimmon or carbon club head when it is hit.

Still another object of the present invention is to provide a process for easily producing such a wood-type metal golf club head.

The wood-type metal golf club head of the present invention attaining the above objects comprises a hollow metal head body and a core material filling the inside of the metal head body, wherein said core material is an aggregate prepared by fusing expandable beads comprising a microcapsule of a synthetic polymer and a gas enclosed therein to each other by the thermal expansion of the gas.

According to the present invention, a core material is formed by fusing many particulate expandable beads to each other by the expansion of the gas enclosed therein to form an aggregate, so that the inside of a metal head body can be filled with many cells uniformly dispersed therein, by which a lengthened shot can be attained and the metallic sound can be reduced. Further, by limiting the bulk specific gravity of the core material within a range of 0.05 to 0.15 g/cm$^3$, a lengthened shot can be attained and the sound made during hitting is similar to that of a persimmon or carbon club head.

A wood-type metal golf club head having these excellent properties can be produced by forming a metal into a hollow metal head body, injecting expandable beads comprising a microcapsule of a synthetic polymer and a gas enclosed therein into the cavity of the metal head body and the heating the resulting metal head to expand the beads, thereby attaching the beads to one another by fusion and thus forming a core material.

DETAILED DESCRIPTION OF THE INVENTION

Figure 1:
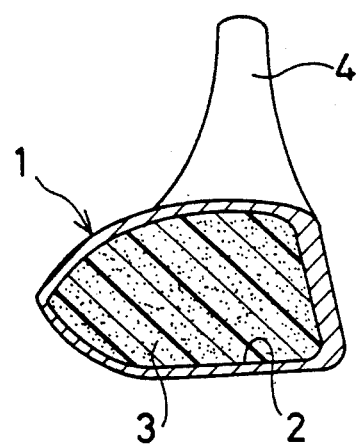
FIG. 1 is a cross-sectional view of the wood-type metal golf club head of the present invention.

In the golf club head shown in ..FIG. 1, a hollow metal head body 1 has a cavity 2 in its interior and a neck 4 to which a shaft is fixed. The cavity 2 is filled with a cellular core material 3 which, in accordance with the present invention, is an aggregate of expandable beads fused to each other.

The expandable bead to be used in the present invention comprises a microcapsule of a synthetic polymer so that a gas enclosed therein and the volume of the bead will be expanded several times as much by heating it. The expandable bead to be preferably used is one having a mean particle diameter of as small as 5 to 30 μm in an unexpanded state and 10 to 100 μm in a thermally expanded state.

The synthetic polymer to be used in the preparation of the microcapsule constituting the expandable bead is preferably a vinylidene chloride polymer. The vinylidene chloride polymer includes not only vinylidene chloride homopolymer but also vinylidene chloride copolymers. The comonomer to be copolymerized with vinylidene chloride is preferably vinyl chloride, acrylonitrile or methacrylonitrile. Among these synthetic polymers, a vinylidene chloride-acrylonitrile copolymer is particularly preferable as the material of the above microcapsule. The expanding gas to be enclosed in the bead is preferably propane, n-butane, isobutane, n-pentane or isopentane, with the use of isobutane being preferred.

The wood-type metal golf club head of the present invention can be produced by the use of an expandable bead described above as follows.

Figure 2:
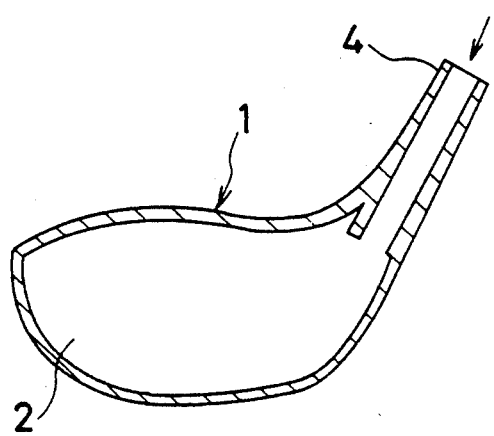
FIG. 2 is a cross-sectional view of the metal head body to be used in making the wood-type metal golf club head of the present invention.

First, a metal material is formed into a hollow metal head 1 as shown in FIG. 2. The metal material is preferably stainless steel or an aluminium alloy, though it is not particularly limited. Then, expandable beads are injected into the cavity 2 through the neck 4 of the metal head body 1. The total volume of the beads to be injected may be 1/5~1/10 of that of the cavity 2. Thereafter, the resulting metal head body 1 is heated at 80° to 150° C. for about 30 minutes, during which the micro-capsules constituting the beads are expanded by the expansion of the gas enclosed therein, so that the cavity 2 is filled with the beads fused to each other, thus forming a core material 3. The core material 3 thus formed, fills the cavity 2 in a state wherein fine cells are uniformly dispersed. As a result, a lengthened shot can be attained and the metallic sound made during hitting is reduced.

According to the present invention, the bulk specific gravity of the core material contained in the metal golf club head thus produced is adjusted to 0.05, to 0.15 g/cm$^3$, more preferably 0.07 to 0.13 g/cm$^3$. By adjusting the bulk specific gravity of the core material to such a range, a maximum initial speed efficiency of the club head can be attained. The term "initial speed efficiency ($\eta$)" is defined by the equation: $\eta$=the initial speed of hit ball/the speed of club head. A higher initial speed efficiency gives a longer shot and a uncomfortable reduced uncomfortable metallic sound.

Figure 3:
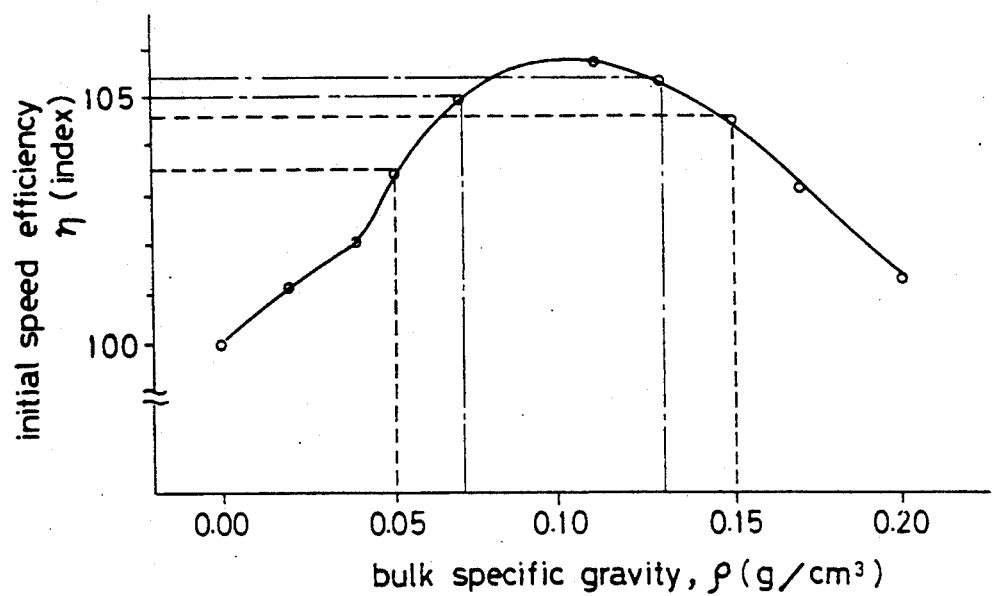
FIG. 3 is a graph showing the relationship between the bulk specific gravity of a core material and initial speed efficiency.

FIG. 3 shows the relationship between the bulk specific gravity of the core material and the initial speed efficiency with respect to a metal golf club head produced according to the present invention. It is to understood from the results given in FIG. 3 that the initial speed efficiency is enhanced when the bulk specific gravity of the core material falls within the range of 0.05 to 0.15 g/cm$^3$, preferably 0.07 to 0.13 g/cm$^3$. The results given in FIG. 3 were obtained under the following conditions:

metal head body: made of stainless steel SUS 17-4
cavity volume: 75 ml, expandable bead: vinylidene chloride-acrylonitrile copolymer microcapsule containing isobutane (trade name: Expancel, a product of Japan Filite Co., Ltd.)

heating (expansion): at 120° C. for 30 minutes initial speed efficiency: determined based on the initial speed of a ball hit by a swing robot at a head speed of 27 m/sec. The initial speed efficiency ($\eta$) given in FIG. 3 was shown by an index calculated by assuming the initial speed of a ball hit with a golf club having a metal head not filled with any core material to be 100 (base).

As described above, the wood-type metal golf club head according to the present invention is characterized by having a core material in which cells are uniformly dispersed, by which shot can be attained and the undesirable metallic sound made during can be reduced.

What is claimed is:

1. A wood-type metal golf club head comprising a hollow metal head body and a core material filling the inside of the metal head body, wherein said core material is an aggregate prepared by fusing expandable beads comprising a microcapsule of a synthetic polymer and an expanding gas enclosed therein to each other by the expansion of the gas and has a bulk specific gravity of 0.05 to 0.15 g/cm$^3$.

2. A wood-type metal golf club head as set forth in claim 1, wherein the bulk specific gravity of the core material is 0.07 to 0.13 g/cm$^3$.

3. A wood-type metal golf club head as set forth in claim 1, wherein the synthetic polymer constituting the microcapsule is a vinylidene chloride polymer.

4. A wood-type metal golf club head as set forth in claim 3, wherein said vinylidene chloride polymer is one member selected from the group consisting of vinylidene chloride homopolymer, vinylidene chloride-vinyl chloride copolymer, vinylidene chloride-acrylonitrile copolymer and vinylidene chloride-methacrylonitrile copolymer.

5. A wood-type metal golf club head as set forth in claim 1, wherein said expanding gas enclosed in the microcapsule is one member selected from the group consisting of propane, n-butane, isobutane, n-pentane and isopentane.

6. A process for producing a wood-type metal golf club head, which comprises forming a metal material into a hollow metal head body, injecting expandable beads comprising a microcapsule of a synthetic polymer and an expanding gas enclosed therein into the cavity of the metal head body and heating the resulting metal head body to fuse the beads to each other with the expansion of the beads and form a core material having a bulk specific gravity of from 0.05 to 0.15 g/cm$^3$.

7. A process for producing a wood-type metal golf club head as set forth in claim 7, wherein the synthetic polymer constituting the microcapsule is a vinylidene chloride polymer.

8. A process for producing a wood-type metal golf club head as set forth in claim 7, wherein said vinylidene chloride polymer is one member selected from the group consisting of vinylidene chloride homopolymer, vinylidene chloride-vinyl chloride copolymer, vinylidene chloride-acrylonitrile copolymer and vinylidene chloride-methacrylonitrile copolymer.

9. A process for producing a wood-type metal golf club head as set forth in claim 6, wherein the expanding gas enclosed in the microcapsule is one member selected from the group consisting of propane, n-butane, isobutane, n-pentane and isopentane.

10. A process for producing a wood-type metal golf club head as set forth in claim 6, wherein the bulk specific gravity of the core material is from 0.07 to 0.13 g/cm$^3$.

* * * * *

UNITED STATES PATENT AND TRADEMARK OFFICE
CERTIFICATE OF CORRECTION

PATENT NO. : 5,135,227
DATED : August 4, 1992
INVENTOR(S) : Takaharu Okumoto et al.

It is certified that error appears in the above-identified patent and that said Letters Patent is hereby corrected as shown below:

Title page, insert, item

[30]    Foreign Application Priority Data

Aug. 30, 1990 [JP]    Japan ...............2-226732

Dec. 25, 1990 [JP]    Japan ...............2-405632

Claim 7, column 4, line 23, change "claim 7" to --claim 6--.

Signed and Sealed this

Fourteenth Day of September, 1993

Attest:

BRUCE LEHMAN

*Attesting Officer*    *Commissioner of Patents and Trademarks*